United States Patent
Nishida et al.

[11] Patent Number: 6,146,597
[45] Date of Patent: *Nov. 14, 2000

[54] SEPARATION DEVICE

[75] Inventors: Syozo Nishida; Yuichiro Fujiyama, both of Yokohama, Japan

[73] Assignees: Petroleum Energy Center; Nippon Mitsubishi Oil Corp., both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/042,403

[22] Filed: Mar. 13, 1998

[30] Foreign Application Priority Data

Mar. 14, 1997 [JP] Japan ..................... 9-082369

[51] Int. Cl.⁷ .................................. B01D 45/12
[52] U.S. Cl. ......................... 422/147; 422/139; 422/144; 55/337; 55/459.3
[58] Field of Search ..................... 422/139, 144, 422/147; 55/459.3, 337, DIG. 30

[56] References Cited

U.S. PATENT DOCUMENTS

| | | | |
|---|---|---|---|
| 3,074,878 | 1/1963 | Pappas | 55/461 |
| 3,957,471 | 5/1976 | Tamachi et al. | 55/DIG. 30 |
| 4,741,883 | 5/1988 | Haddad et al. | 422/144 |
| 5,215,720 | 6/1993 | Cetinkaya | 422/147 |
| 5,538,623 | 7/1996 | Johnson et al. | 208/120.01 |
| 5,552,120 | 9/1996 | Sechrist et al. | 422/144 |

FOREIGN PATENT DOCUMENTS

| | | |
|---|---|---|
| 0 332 277 | 9/1989 | European Pat. Off. . |
| 0 424 079 A1 | 4/1991 | European Pat. Off. . |
| 0 745 417 A2 | 12/1996 | European Pat. Off. . |
| 1526957 | 9/1970 | Germany . |
| 60-18447 | 5/1985 | Japan . |

*Primary Examiner*—Hien Tran
*Attorney, Agent, or Firm*—Akin, Gump, Strauss, Hauer & Feld, L.L.P.

[57] ABSTRACT

A device is disclosed for the quick separation between solid materials and reaction gaseous materials which comprises a vertically oriented inner cylindrical body with a closed end, which cylindrical body forms at the other end an inlet through which a mixture of the catalyst and the gaseous material is introduced and a substantially airtight outer cylindrical body disposed coaxially with said inner cylindrical body in surrounding relation thereto and forming at the upper portion a gas-discharging port communicating with the outside of the device and at the lower port a particle-discharging port communicating with the outside of the device, the inner cylindrical body being provided in the side surface with a plurality of elongated slits extending in the axial direction and spaced equally apart in the circumferential direction and a plurality of curved or flat guide vanes protruding outwardly from the proximity of the longitudinal edges of the slits at a certain angle with respect to the radial direction of the inner cylindrical body and extending vertically in a predetermined length. The device is increased in separation efficiency with a short residence time of the gaseous material even when the catalyst particles are contained in the mixture at a higher mix ratio.

4 Claims, 3 Drawing Sheets

(a)

(b)

(c)

(a)  (b)

SEPARATION DEVICE

BACKGROUND OF THE INVENTION

1. Field of the Invention

This invention relates to separation devices, more specifically to a separation device for the quick separation between a solid material and a gaseous material from a mixture thereof.

2. Prior Art

There are known a reaction system in which a solid particle as a catalyst or heat medium is brought into contact with a reactant A fluidized bed type reactor is a typical example of such reaction system which reactor is classified into one utilizing a dense-phase fluid bed (bubbles-fluid bed) and the other utilizing a high-velocity moving bed The high-velocity moving fluid bed is used for a reaction in which a solid and a gas must come into contact for a short period of time. Currently, there has been mainly employed an upward flow-type high velocity moving bed reactor called "riser" in a fluid catalytic cracking (F.C.C) apparatus used for the production of a gasoline from a feedstock such as a heavy oil. This reactor is capable of reducing contact time due to an improvement of a catalyst in ability, leading to an enhancement of selectivity of a final product and depression of excessive cracking reaction.

One problem faced by a conventional high velocity fluidized bed reactor is the need to obtain a quick separation of fine catalyst particles form from reaction vaporized product leaving a riser reactor in a system. Therefore, an improvement of separation device has been demanded. In order to deal with such a problem, it has been proposed to use a separation system so called "closed cyclone" disposed in close proximity of the discharging end of riser in an FCC apparatus for producing gasoline from heavy oil as disclosed in U.S. Pat. Nos. 5,552,120 and 5,538,623.

It becomes more important to obtain the quick separation between solids and reaction gaseous material at the discharging port of a reactor particularly when in an FCC apparatus Light olefin is intended to be produced with a short contact time process effected for 0.1 to 1.5 second. In such a short contact reaction, the existing separation device such as a cyclone invites a reduction in yield of the reaction product and coke deposition because gaseous materials have a longer residence time in a reactor than in the separation device, leading to further reaction progressed in the separation device Instead of separating a catalyst from the mixture using a separation device for a short contact reaction, the further reaction can be avoided by cooling the mixture of the reaction product and a catalyst quickly at the discharging end of a riser. However, in an FCC apparatus for producing gasoline from heavy petroleum fractions, the catalyst is regenerated by heating at elevated temperatures to use for reaction as heat medium. Therefore, this idea is not preferable in terms of heat efficiency.

After all, the effective method for avoiding excess reaction is the quick separation between catalyst particles and reaction gaseous materials at the outlet port of a reactor. If the catalyst particles can be separated mostly but not completely, the catalyst become less contributive in effecting the reaction in the following cyclone even if they reside longer therein. If the reaction in the cyclone can not be ignored, the rapid cooling may be effected at the inlet port of the cyclone so that the catalyst can be regenerated without affecting heat efficiency of the apparatus.

U.S. Pat. No 3,074,878 discloses a process for quick separation of a mixture at the outlet port of a reactor. In this process, a solids-gas mixture passing downwardly is deflected to one side of a tubular reactor by a baffle element disposed therein and sprayed transversely with a gas from the other side. However, the spraying angle can not be altered more than 90 degrees, resulting in poor separation efficiency. Furthermore, the baffle element is prone to abrasion due to direct impact with the solids.

Another example of the quick separation is disclosed in Japanese Patent Publication No. 60-18447 in which a rectangular chamber is disposed horizontally with respect to a downflow or upflow type reactor. After the mixture flows into the chamber from one end thereof and changes the flow direction at an angle of 90°, the catalyst particles and the reactant gaseous material are removed from the other end of the chamber in the upward and downward directions, respectively. However, as the flow of the mixture in the chamber is extremely turbulent, the separated catalyst fails to flow toward the discharging port of the chamber efficiently and thus tends to be whirled upwardly in the chamber, resulting in a reduction of separation efficiency. This tendency becomes more remarkable as the mixing ratio of the catalyst in the mixture increases.

In a process in which contact time must be shortened to improve selectivity of a reaction product, it is absolutely necessary to increase the recycle rate of a catalyst for compensating for the reduction of conversion ratio due to the short contact time. Taking this background into account, there has been demanded a high-speed separation device which can effect a quick separation between catalyst particles and reaction gaseous material from the mixture thereof in the a large mix ratio of the particles.

The term "separation efficiency" used herein designates the ratio of the solids separated out from the mixture supplied into the separation device, i.e. the ratio of the solids discharged out from the outlet of the separation device which ratio is represented by the following formula:

Separation Efficiency (%)=(Weight of the solids withdrawn from the discharge port)/(Weight of the solids supplied into the separation device)

The term "mix ratio" used herein is a numerical value derived by the following formula:

Mixing ratio=(Weight of solids)/(Weight of gaseous reaction product)

SUMMARY OF THE INVENTION

With the foregoing difficulties of the prior art in view, the present invention seeks to provide a separation device which can separate solids at a higher rate even with the shorter residence time of a gaseous reaction material, compared with a conventional separator device.

According to the invention, there is provided a separation device for the quick separation between particles having a diameter of 1–500 μm and gaseous materials which comprises a vertically oriented inner cylindrical body with a closed end which body forms at the other end an inlet through which a mixture of the catalyst and the gaseous material is introduced and a substantially airtight outer cylindrical body disposed coaxially with the inner cylindrical body in surrounding relation thereto and forming at the upper portion a gas-discharging port communicating with the outside of the device and at the lower port a particle-discharging port communicating with the outside of the device, the inner cylindrical body being provided in the side surface with a plurality of elongated slits extending in the axial direction and spaced equally apart in the circumferential direction and a plurality of curved or flat guide vanes protruding outwardly from the proximity of the longitudinal edges of the slits at a certain angle with respect to the radial direction of the inner cylindrical body and extending vertically in a predetermined length.

The inventive separation device has a dual structure comprising an outer cylindrical body and an inner cylindrical body, a mixture of solid particles and gaseous materials being introduced into the inner cylindrical body. The inner cylindrical body is sealed with a bottom or top plate at one end which is opposite to the end in the form of a inlet through which the mixture is introduced. Moreover, the inner cylindrical body is provided in the side surface with a plurality of slits extending axially through which the mixture altered in flow direction by the top or bottom plate is routed to the space defined between the outer and inner cylindrical bodies. The mixture entered into the space is forced to flow spirally in the circumferential direction of the inner cylindrical body by a plurality of guide vanes protruding outwardly from the proximity of the edge of each slits, whereupon the solid particles are separated from the mixture by the centrifugal force developed by the spiral flow. The separated particles then fall toward the bottom of the outer cylindrical body by gravity after hitting the inner wall surface thereof and discharged out from the device through a discharging port. In this way, a quick separation can be achieved. The quick separation can be ensured by a separation device under the conditions that the slits and the guide vanes are provided 2–16 in number, the diameter ratio between the outer cylindrical body and the inner cylindrical body is 1.1 to 20 and the effective length of the outer cylindrical body is 1–30 times greater than the diameter of the inner cylindrical body. Furthermore, the inventive separation device can be improved in performance by arranging a pre-stripping mechanism in the lower interior of the outer cylindrical body Other advantages, aspects, embodiments and details of this invention are set forth in the following detailed description of the invention.

DETAILED DESCRIPTION OF THE INVENTION

Figure 1:
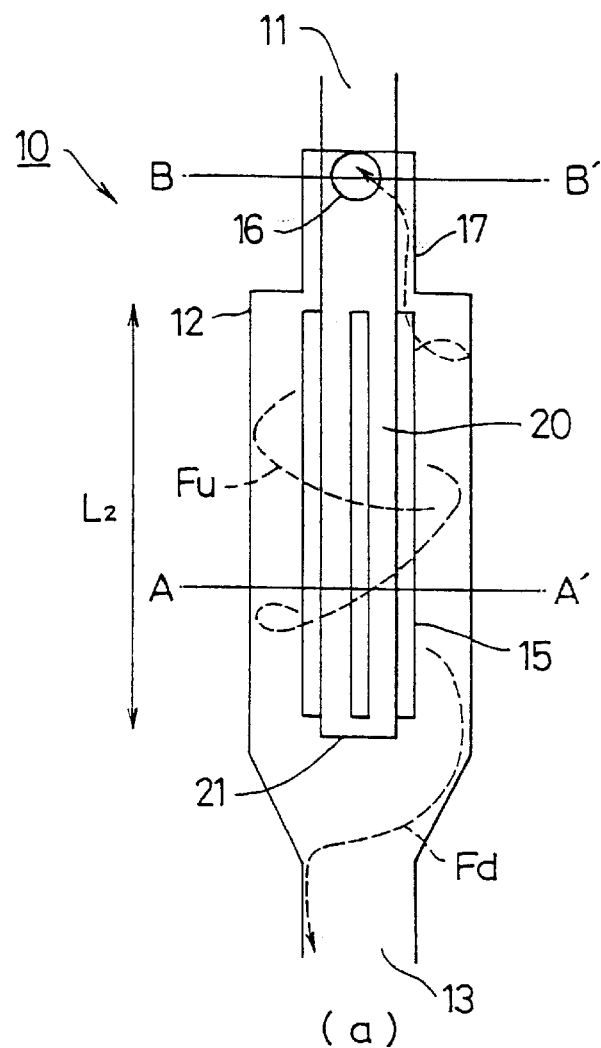
FIGS. 1(a), (b) and (c) are a longitudinal sectional view, cross sectional views of a separation device of this invention.
Figure 1:
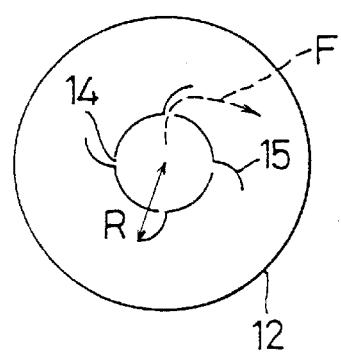
Figure 1:
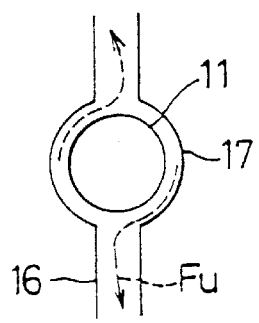

Referring now to the drawings, particularly FIG. 1, there is shown a separation device 10 having a dual structure comprising an inner cylindrical body 20 and an outer cylindrical body 12 which are coaxially disposed and extend vertically The inner cylindrical body has a bottom enclosed with a plate 21 and an upper part forming an inlet port 11 through which a mixture of a catalyst and a gaseous material are supplied and is provided in the peripheral side surface with a plurality of elongated slits in the side.

The outer cylindrical body 12 is disposed in surrounding and in concentric relation to the inner cylindrical body 20 and has the upper portion reduced in diameter and provided with an outlet 16 for discharging a gaseous material which communicates with the outside of the device but is separated from the interior of the inner cylindrical body 20. In this embodiment, the upper portion forms a gas-discharging pipe 17 has two outlets disposed in opposed relation and connected with pipes, respectively as better shown in FIG. 1(c), whereas the lower portion has a particle-discharging port 13 communicating with the outside of the device as well. In this drawing, the lower portion is in a conical shape and connected with the cylindrical particle-discharging port or outlet 13. Therefore, the whole outer cylindrical body 12 except the upper and lower portion thereof is substantially closed.

The dimensions of outer and inner cylindrical bodies 12 and 20 are such that the ratio thereof in diameter is in the range of 1.1 to 20 and the effective length of the outer cylindrical body 12 is 1 to 30 times greater than the diameter of inner cylindrical body 20. Further explanation is given hereinbelow in more detail.

The inner cylindrical body 20 is provided in the side peripheral portion with a plurality of rectangular slits 14 extending axially and spaced equally apart in the circumferential direction. Furthermore, the inner cylindrical body 20 is provided with a plurality of elongated curved guide vanes 15 extruding outwardly from the proximity of the edge of each silts at a certain angle with respect to the radial direction of inner cylindrical body and having a width of a certain length extending longitudinally. The guide vane may be flat. The slit 14 and the guide vane are preferably provided 2–16 in number.

The above-mentioned pats constituting the inventive separation device are formed from any suitable material which can withstand chemical reaction. For example, stainless steel excels in workability and chemical resistance and thus is preferred for the purposes of the invention Each of the parts may be formed from different materials.

In the following, there is described a process for separating between a catalyst and a reaction gaseous material using the inventive separation device. A mixture of gas and solids is introduced through an inlet 11 into an inner cylindrical body 20 at a predetermined speed. The lower end of inner cylindrical body is enclosed with the plate 21. Therefore, the bottom of inner cylindrical body 20 are collided with solids separated therein immediately after commencement of the introduction of the mixture but are protected from such a collision by the catalyst (solids) bed accumulated on the bottom of inner cylindrical body 20.

The mixture flows downwardly in the inner cylindrical body 20 and flows horizontally after colliding with the bed piled up in the bottom of the cylindrical body 20. The mixture flows out from the inner cylindrical body through the plurality of slits as indicated by Arrow F in FIG.1. The mixture is then altered in flow direction by the plurality of guide vanes, resulting in the formation of spiral flow in the space defined between the inner and outer cylindrical bodies 12 and 20. In this process, the solids in the mixture are separated therefrom by centrifugal action and flow to the inner peripheral wall of outer cylindrical body 12. The solids then spiral downwardly toward the bottom of the outer cylindrical body by gravity as indicated by Arrow Fd in FIG. 1 and are discharged out from the device through the outlet 13. On the other hand, the gaseous material which is lighter in mass than the solids, spirals upwardly toward the discharging pipe 17 and discharged out from the device through the outlet 16 as indicated by Arrow Fu in FIG. 1 to be transported to the succeeding device.

Herein again, the outer and inner cylindrical bodies, the slits and the guide vanes are further described in detail. First of all, factors affecting the separation efficiency in a separation device are described below.

The factors affecting the separation efficiency are exemplified with particle size and density, difference in density between a solid and a gaseous material, and centrifugal force of spiral flow. The separation efficiency is increased as these factors are large in value The centrifugal force can be varied depending upon the structure of the separation device while the other factors can not be varied because they are peculiar to the mixture to be separated.

Next, there are described the effects as to centrifugal force and the structure of a separation device. It is assumed that a mixture passes through an inner cylindrical body at a fixed linear velocity. In this case, if the slits are the same in number, a separation device can be increased in separation efficiency by reducing the opening area of the slit to increase the linear velocity of the mixture upon passing therethrough, resulting in an increase of centrifugal force but also resulting in an adverse effect that erosion progresses. If the mixture passes through the slits at the same linear velocity, a separation device is increased in separation efficiency by reducing the area of per slits and increasing the number of slits, resulting in a stable centrifugal force but leading to a separation device complicated in structure.

In view of these facts, the number of slits is determined by total evaluation with respect to separation efficiency to be demanded, the tolerance level of erosion and the complexity of the device and finally determined by the experimental results conducted using a various type of mixture.

In the drawings, slits are shown four in number but is selective from 2 to 16, preferably from 3 to 8, more preferably from 4 to 6.

A single slit would fail to develop a spiral flow sufficiently to effect the separation. Slits exceeding 16 in number would lead to a device complicated in structure and increased in production costs and could not improve a separation efficiency as expected. The number of aforementioned slits is based on the results of total evaluation derived from the analysis of the experiment conducted with the use of mixture which is actually used in a fluidized catalyst cracking apparatus for producing a gasoline from a feedstock such as heavy oil. The number of slits has an influence on the separation efficiency of the separation device and thus should be determined by conducting an experiment.

The width of slits suitable for practical use is represented by the following formula using the circumference L1 of inner cylindrical body:

Width of Slit=1 mm-L1/4, preferably L1/16 to L1/62

The length of slits suitable for practical use is represented by the following formula using the length (L2) between the upper portion of outer cylindrical body and the bottom of inner cylindrical body (FIG. 1) or between the upper plate of inner cylindrical body and the lower end of outer cylindrical body:

Length of Slit=L2×a wherein a is in the range of 0.1 to 0.99, preferably 0.7 to 0.95.

The area of slit is determined such that the linear speed of mixture upon passing through the slits is 1–100, preferably 3–30, more preferably 3–15 m/s. If the area of slits is determined, the width and length thereof are correspondingly determined.

Linear speed less than 1 m/s would fail to spiral the mixture at a speed sufficient to effect the separation completely. Linear speed exceeding 100 m/s would result in abrasion of the slits, guide the vanes and the inner peripheral wall of the outer cylindrical body.

Figure 2:
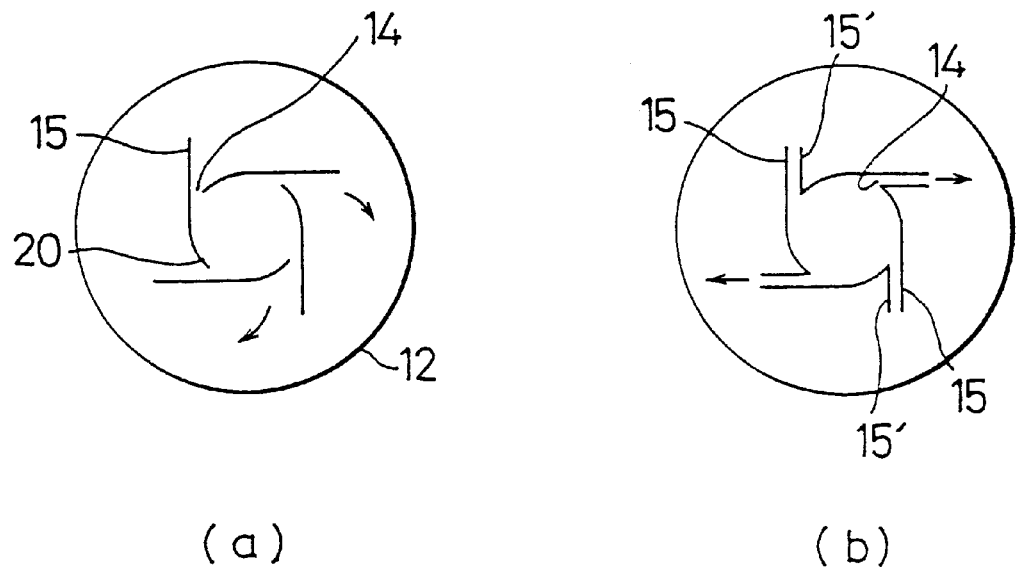
FIGS. 2(a) and (b) are cross sectional views of a separation device each showing a guide vane in different shape.

The guide vanes 15 are disposed in the same number as the slits and along the longitudinal edge thereof The guide vane 15 may be curved or flat as shown in a cross section in FIG. 2. Furthermore, as shown in FIG. 2 (b), two parallel vanes in pair 15, 15 may be disposed on both sides of the slits. The important thing is that the plurality of guide vanes protrude outwardly from the proximity of each of the slits at a certain angle with respect to the radial direction of inner cylindrical body and have a width in a predetermined length. Furthermore, the guide vanes each are the same shape and spaced equally apart in the circumferential direction of the inner cylindrical body to obtain smooth operation in viewing the separation device totally. There may be disposed guide vanes each of which is separated in section correspondingly to each of the silts.

The width of a guide vane is indirectly represented the following formula using the distance (R) between the center of the inner cylindrical body and the tip of the guide vane:

Width of Guide Vane=(R−the radial of inner cylindrical body)= (the radial of the outer cylindrical body)×b wherein b is in the range of 0.2–0.99, preferably 0.5–0.8.

b less than 0.2, namely too small width of the guide vane would fail to change the flow direction of mixture routed out through the slits, resulting in a reduction of spiral speed of the mixture. If b exceeds 0.99, namely the guide vane having too wide width, the mixture flowing spirally comes to contact with the guide vanes, leading to abrasion thereof due to a reduction of a space between the guide vane and the inner wall of the outer cylindrical body.

The length of the guide vane can be stipulated as follows.

Minimum length of the guide vane=length of slit/2

Maximum length of the guide vane length of the outer cylindrical body.

Preferred length of the guide vane=0.8×length of the outer cylindrical body.

The diameter of inner cylindrical body is preferably the same as that of the inlet pipe directly connected therewith and may be down- or up-sized to provide the mixture passing through the inner cylindrical body with a suitable linear speed. More specifically, the diameter of inner cylindrical body is determined such that the linear speed of the mixture therein is 1–100, preferably 3–30, more preferably 3–15 m/s.

The diameter of outer cylindrical body is 1.1 to 20 times greater than that of the inner cylindrical body. If attaching greater importance to a reduction of residence time of the mixture in the inner cylindrical body, the diameter of outer cylindrical body should be reduced as small as possible and specifically be 1.1 to 3 times greater than the diameter of the inner cylindrical body.

The length of outer cylindrical body is 1 to 50 times greater than the diameter of the inner cylindrical body. If attaching greater importance to a reduction of residence time of the mixture in the inner cylindrical body, the diameter of the outer cylindrical body should be reduced as small as possible and specifically be 1 to 5 times greater than the diameter of the inner cylindrical body.

The inventive separation device is advantageous in that a separation efficiency can be increased because the separation is effected using a centrifugal force developed by the spiral flow of a mixture as well as a tangential cyclone and that the device can bring about the spiral flow of the mixture stably in the whole device because it passes through a very narrow slit-like port extending longitudinally over the device even if the mixture flows at a low linear speed. Whereby, a gaseous material flows spirally toward the upper portion of separation device and is narrow in residence time distribution in the device and reduced in pressure loss, resulting from a small difference in spiral speed between in the upper stream and in the lower stream. Furthermore, a residence time is also reduced because the inventive device is devoid of a cone-like section unlike a tangential cyclone. Furthermore, the inventive separation device is superior in separation efficiency to a tangential cyclone because the separation efficiency is increased as the force exerted on the catalyst particles increases.

If the mixture flows downwardly in the inventive device, the portion most susceptible to impact by the mixture is the bottom plate of the inner cylindrical body which, however, is protected from such impact with the solids (catalyst) bed piled on the space defined by the bottom plate and the lower end of the silt. If the mixture flows upwardly in the inventive device, the gaseous material resides in the space defined between the upper end of slit and the upper plate of the inner cylindrical body so that the impact of the mixture is absorbed in this space.

The guide vanes are less susceptible to abrasion because of its arrangement in parallel relation to the flow direction of the mixture after passing through the slits. Furthermore, the edge of each slits and the inner peripheral wall surface of the outer cylindrical body are also less susceptible to abrasion because the mixture routed out through the slits can be reduced in linear speed.

In the case of using the inventive device in a fluidized catalyst cracking apparatus for producing gasoline from a feedstock such as heavy oil, the solid-discharging port of the device is connected with a stripping device located in the lower stream in the apparatus. The catalyst particles introduced from the discharging port contain a gaseous material in the space between the particles and heavy oil absorbed by the particles. These deposit materials are removed by inert gas such as steam in the stripping device.

In a short contact time reaction process, the stripping device may cause a problem. More specifically, as the catalyst particles reside in the stripping device for a relatively longer period of time, the reaction between the catalyst and the gaseous material and/or the heavy oil depositing thereon until completion of stripping. In order to prevent a part of the gaseous material from entering into the stripping device, the inventive separation device is provided with a pre-stripping means having a small volume in which the catalyst particles reside for a short period of time.

Figure 3:
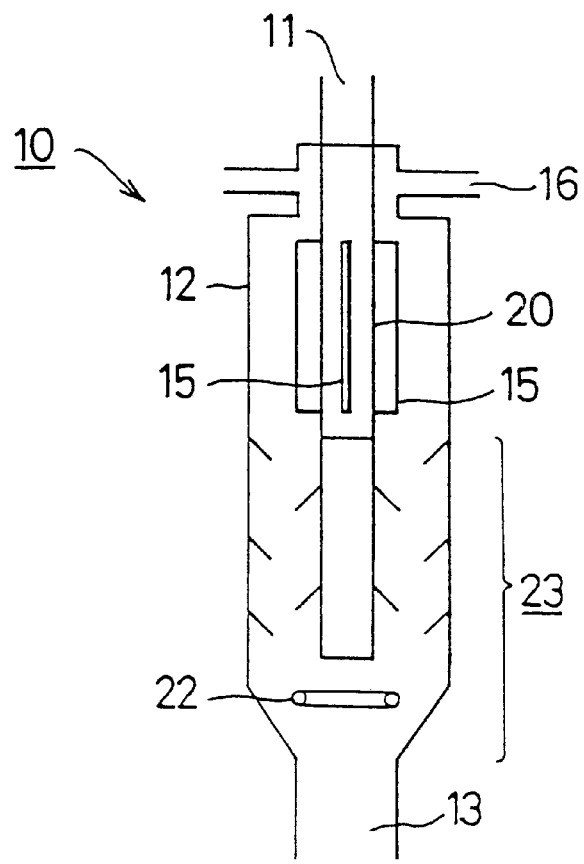
FIG. 3 is a longitudinal sectional view of an another embodiment of a separation device of this invention.
Figure 5:
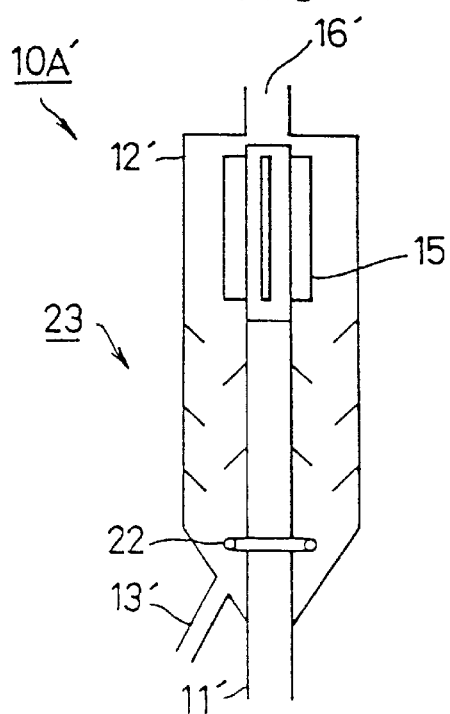
FIG. 5 is a longitudinal sectional view of further another embodiment of a separation device of this invention

FIGS. 3 and 5 each show a separation device of which lower portion is incorporated with an equivalent mechanism which functions as the pre-stripping device as indicated by numeral 23. In these drawings, although there is employed a pre-stripping mechanism (device) which disperses solid particles by the combination of means of a plurality of baffles with a circular steam feed device indicated by numeral 22, the inventive separation device may be equipped with another pre-stripping device such as those using a perforated tray or a dense-phase fluidized bed.

Gas, oil vapor and stripping steam generated from the pre-stripping device are directly introduced into the space between the inner and outer cylindrical bodies but not discharged to the outside of the separation device, resulting in an improvement of pre-stripping efficiency and a reduction of the apparatus in size. The reason for making possible the direct introduction is that the separation efficiency of the inventive device is not affected due to the stable stream covering broadly and maintained to the bottom of the device.

The invention will be further described with the results of the experiments conducted using the examples embodying the inventive device.

In the experiment, there were used five types of separation devices varied in the width and length of a slit, the width of a guide vane, the diameter and length of an outer cylindrical body and the number of slit. As a finely divided solid material, a catalyst used in an FCC apparatus for producing gasoline from heavy oil was used The catalyst has an average particle size of 63 microns and a bulk density of 0.85 g/cm3. The air was used as a gaseous material to be mixed with the catalyst The dimensions of each of the five devices referred to as Devices A, B, C, D and E are shown in Table 1.

TABLE 1

|  | Device A | Device B | Device C | Device D | Device E |
|---|---|---|---|---|---|
| Diameter of Inner Cylindrical Body mm | 40 | 40 | 40 | 40 | 40 |
| Diameter of Outer Cylindrical Body mm | 100 | 100 | 80 | 80 | 80 |
| Length of Outer Cylindrical Body mm | 160 | 160 | 160 | 120 | 160 |
| Diameter of Catalyst Discharging Port mm | 50 | 50 | 50 | 50 | 50 |
| Width of Slit mm | 8 | 8 | 8 | 8 | 4 |
| Length of Slit mm | 80 | 80 | 80 | 40 | 80 |
| Width of Guide Vane mm | 30 | 30 | 15 | 15 | 15 |
| Length of Guide Vane mm | 120 | 120 | 120 | 80 | 120 |
| Number of Slit | 4 | 3 | 4 | 4 | 4 |

Table 2 shows a separation efficiency of Device A with varied the linear speed of the air in the inner cylindrical body and the mixing ratio (catalyst weight/air weight). The resulting separation efficiency was more than 99% when the linear speed and mixing ratio were 15 m/s and 29, respectively both of which are equivalent to the conditions under which a reaction is effected in a reactor of an FCC apparatus. The same result was obtained with the linear speed of 30 m/s.

TABLE 2

| Linear Speed in Inner Cylindrical Body | 5 | | | 15 | | | 30 | | |
|---|---|---|---|---|---|---|---|---|---|
| Linear Speed at Slit m/s | 2.5 | → | → | 7.4 | → | → | 15 | → | → |
| Mix Ratio | 20 | 48 | 87 | 20 | 48 | 87 | 4 | 6 | 14 |
| Separation Efficiency % | 99> | 99> | 99> | 99> | 99> | 99> | 99 | 99 | 99 |

The same experiment was conducted using Device B and the results are shown in Table 3. As three slits are provided in Device B, the linear speed at the slits was 4/3 times greater than that of Device A. The separation efficiency was more than 99% and more than 97% at linear speed of under 15 m/s and of 30 m/s, respectively.

TABLE 3

| Linear Speed in Inner Cylindrical Body | 5 | | | 15 | | | 30 | | |
|---|---|---|---|---|---|---|---|---|---|
| Linear Speed at Slit m/s | 3.3 | → | → | 9.8 | → | → | 20 | → | → |
| Mix Ratio | 20 | 46 | 89 | 7 | 12 | 27 | 4 | 6 | 14 |
| Separation Efficiency % | 99> | 99> | 99> | 99> | 99> | 99> | 98 | 97 | 99 |

Table 4 shows the results of the same experiment conducted using Device C. Device C had a diameter as the same as 8/10 of that of Device A and correspondingly a width as the same as half of that of Device A. The resulting separation efficiency was more than 99% and more than 95% at a linear speed of less than 15 m/s and of 30 m/s, respectively.

TABLE 4

| Linear Speed in Inner Cylindrical Body | 5 | | | 15 | | | 30 | | |
|---|---|---|---|---|---|---|---|---|---|
| Linear Speed at Slit m/s | 2.5 | → | → | 7.4 | → | → | 14.7 | → | → |
| Mix Ratio | 20 | 47 | 87 | 7 | 12 | 28 | 4 | 6 | 15 |
| Separation Efficiency % | 99> | 99> | 99> | 99> | 99> | 99> | 99 | 95 | 95 |

Table 5 shows the results of the same experiment conducted using Device D. As the length of slits of Device D was half that of Device C, the linear speed at the slits was 2 times that of Device C. The resulting separation efficiency was more than 92% through the varied conditions.

TABLE 5

| Linear Speed in Inner Cylindrical Body | 5 | | | 15 | | | 30 | | |
|---|---|---|---|---|---|---|---|---|---|
| Linear Speed at Slit m/s | 4.9 | → | → | 15 | → | → | 29 | → | → |
| Mix Ratio | 19 | 46 | 87 | 7 | 13 | 29 | 4 | 6 | 15 |
| Separation Efficiency % | 99> | 99> | 99> | 98 | 97 | 98 | 94 | 93 | 92 |

Table 6 shows the results of the same experiment conducted using Device E. As Device E had the slits of half length of that of Device C, the linear speed of the mixture at the slits was 2 times that of Device C. The separation efficiency was more than 99% and more than 95% at a linear speed of 15 m/s and 30 m/s, respectively.

TABLE 6

| Linear Speed in Inner Cylindrical Body | 5 | | | 15 | | | 30 | | |
|---|---|---|---|---|---|---|---|---|---|
| Linear Speed at Slit m/s | 4.9 | → | → | 15 | → | → | 29 | → | → |
| Mix Ratio | 20 | 48 | 90 | 6 | 13 | 29 | 4 | 6 | 14 |
| Separation Efficiency % | 99> | 99> | 99> | 99> | 99> | 99> | 97 | 97 | 95 |

Although in the above experiments, the inventive devices were illustrated as a downflow type device into which the mixture is introduced from the upper portion of device, the inventive device can be applicable for a downflow separation device.

Figure 4:
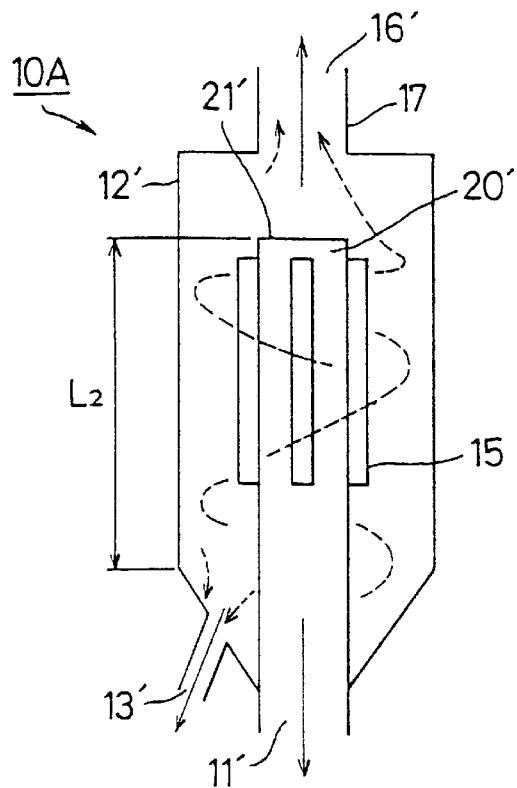
FIG. 4 is a longitudinal sectional view of further another embodiment of a separation device of this invention.

FIG. 4 shows the inventive device 10A used as a downflow type in cross section. The device 10A also is vertically oriented and has a dual structure comprising an inner cylindrical tube or body 20' and an outer cylindrical body 12' disposed coaxially in surround relation to the inner body.

The inner cylindrical body 20' is in the shape of a cylinder extending vertically from the lower portion of the device and having the bottom which opens to form an inlet for introducing a mixture. The inner cylindrical body has the top enclosed with a plate 21' and is provided with a plurality of elongated slits on the side surface. The outer cylindrical body 12' is provided at the center of the top surface with a gas-discharging port 16' having a smaller diameter than that of the body 12' communicating with the interior thereof. The lower end of the outer cylindrical body 12' is reduced in diameter gradually toward the bottom and connected with the outer surface of the inner cylindrical body 20'. A solid-discharging port 13' is provided at the sloped portion of the conical lower bottom of the outer cylindrical body 12'. The outer cylindrical body 12' is substantially retained and airtight except at the upper and lower portion.

The dimensions and material of the device shown in FIG. 4 are the same as those of the device shown in FIG. 1. The inner cylindrical body 20' is also provided with a plurality of slits 14 and guide vanes 15 as well as the device already described above. In FIG. 4 the parts corresponding to those in FIG.1 are indicated by the same numeral. The separation device in FIG. 4 has the same in terms of usage, effect and performance as the devices already mentioned above except that in the former device a mixture is introduced from the inlet 11' formed in the bottom of the inner cylindrical body.

The separation device shown in FIG. 4 can be incorporated with a system which is equivalent to the existing pre-stripping device, by arranging a plurality of baffles or a perforated plate in the lower portion or using a dense-phase fluidized ed. FIG. 5 shows such a modified separation device 10A in section. In this drawing, each of the parts are indicated by the same numerals of the corresponding parts in other drawings. This device can be improved in pre-stripping effect and contributes to downsize a whole FCC apparatus.

What is claimed is:

1. A separation device for the quick separation between particles having a diameter of 1–500 μm and gaseous materials which comprises a vertically oriented inner cylindrical body having a diameter and a closed end which inner cylindrical body forms at the other end an inlet through which a mixture of a catalyst and said gaseous material is introduced, the inlet being in the upper portion of the separation device, and a substantially airtight outer cylindrical body disposed coaxially with said inner cylindrical body in surrounding relation thereto and forming at the upper portion a gas discharging outlet communicating with the outside of said device and at the lower portion a particle-discharging port coaxially disposed with respect to the inlet in the upper portion of the device and communicating with the outside of said device; said inner cylindrical body being provided in the side surface with a plurality of elongated slits extending in the axial direction and spaced equally apart in the circumferential direction and a plurality of curved or flat guide vanes protruding outwardly from the proximity of the longitudinal edges of the slits at a certain angle with respect to the radial direction of the inner cylindrical body and extending vertically in a predetermined length wherein the particle-discharging port has a diameter which is greater than the diameter of the inner cylindrical body.

2. A separation device according to claim 1 wherein said slits and said guide vanes are provided 2–16 in number, respectively, the diameter ratio between said outer cylindrical body and said inner cylindrical body is 1.1 to 20 and the effective length of said outer cylindrical body is 1–30 times greater than the diameter at said inner cylindrical body.

3. A separation device according to claim 1 wherein said outer cylindrical body is provided in the lower interior with a pre-stripping mechanism including a circular steam feed device.

4. A separation device according to claim 3 wherein said pre-stripping mechanism is a plurality of baffles.

* * * * *